United States Patent
Perali et al.

(10) Patent No.: US 10,304,177 B2
(45) Date of Patent: May 28, 2019

(54) SYSTEMS AND METHODS OF USING Z-LAYER CONTEXT IN LOGIC AND HOT SPOT INSPECTION FOR SENSITIVITY IMPROVEMENT AND NUISANCE SUPPRESSION

(71) Applicant: KLA-Tencor Corporation, Milpitas, CA (US)

(72) Inventors: Pavan Kumar Perali, San Jose, CA (US); Hucheng Lee, Cupertino, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 15/600,784

(22) Filed: May 21, 2017

(65) Prior Publication Data

US 2018/0005367 A1     Jan. 4, 2018

Related U.S. Application Data

(60) Provisional application No. 62/356,499, filed on Jun. 29, 2016.

(51) Int. Cl.
*G06T 7/00* (2017.01)
*G06T 7/70* (2017.01)

(52) U.S. Cl.
CPC ............ *G06T 7/0006* (2013.01); *G06T 7/001* (2013.01); *G06T 7/70* (2017.01); *G06T 2207/10061* (2013.01); *G06T 2207/30148* (2013.01)

(58) Field of Classification Search
CPC ............... G06K 9/0063; G06K 9/6857; G06K 2009/485; G06K 9/00791; G06K 9/4609; G06K 9/6212; G06K 9/6255; G06F 17/30256; G06T 7/0006
See application file for complete search history.

(56) References Cited

U.S. PATENT DOCUMENTS

| | | | |
|---|---|---|---|
| 6,215,896 B1 | 4/2001 | Greig et al. | |
| 6,918,101 B1 * | 7/2005 | Satya | G06F 17/5081 716/112 |
| 7,570,796 B2 | 8/2009 | Zafar et al. | |
| 7,676,077 B2 * | 3/2010 | Kulkarni | G06F 17/5045 382/144 |

(Continued)

FOREIGN PATENT DOCUMENTS

| | | |
|---|---|---|
| JP | 2001331784 A | 11/2001 |
| WO | 2015175404 A1 | 11/2015 |

OTHER PUBLICATIONS

ISA/KR, International Search Report for PCT/US2017/037934 dated Sep. 27, 2017.

*Primary Examiner* — Jingge Wu
(74) *Attorney, Agent, or Firm* — Hodgson Russ LLP

(57) ABSTRACT

Systems and methods for removing nuisance data from a defect scan of a wafer are disclosed. A processor receives a design file corresponding to a wafer having one or more z-layers. The processor receives critical areas of the wafer and instructs a subsystem to capture corresponding images of the wafer. Defect locations are received and the design file is aligned with the defect locations. Nuisance data is identified using the potential defect location and the one or more z-layers of the aligned design file. The processor then removes the identified nuisance data from the one or more potential defect locations.

18 Claims, 7 Drawing Sheets

(56) References Cited

U.S. PATENT DOCUMENTS

| | | | |
|---|---|---|---|
| 7,877,722 B2 | 1/2011 | Duffy et al. | |
| 8,041,103 B2 | 10/2011 | Kulkarni et al. | |
| 8,126,255 B2 | 2/2012 | Bhaskar et al. | |
| 8,781,781 B2 | 7/2014 | Kulkarni et al. | |
| 9,087,367 B2* | 7/2015 | Chang | G06T 7/001 |
| 9,092,846 B2* | 7/2015 | Wu | G06T 7/001 |
| 9,170,209 B1 | 10/2015 | Chang et al. | |
| 9,189,844 B2* | 11/2015 | Wu | G06T 7/001 |
| 9,310,320 B2* | 4/2016 | Kurada | G06T 7/0006 |
| 9,311,698 B2 | 4/2016 | Chu et al. | |
| 2002/0018217 A1 | 2/2002 | Weber-Grabau et al. | |
| 2003/0062487 A1* | 4/2003 | Hiroi | G01N 23/22 250/492.2 |
| 2005/0004774 A1* | 1/2005 | Volk | G01N 21/9501 702/108 |
| 2007/0143720 A1* | 6/2007 | Bickford | G06F 17/5081 716/52 |
| 2007/0233419 A1 | 10/2007 | Pack et al. | |
| 2007/0288219 A1* | 12/2007 | Zafar | G03F 1/84 703/14 |
| 2008/0167829 A1 | 7/2008 | Park et al. | |
| 2008/0295047 A1* | 11/2008 | Nehmadi | G06F 17/5068 716/136 |
| 2009/0080759 A1* | 3/2009 | Bhaskar | G06T 7/001 382/141 |
| 2010/0188657 A1 | 7/2010 | Chen et al. | |
| 2013/0318485 A1* | 11/2013 | Park | G06F 17/5081 716/102 |
| 2014/0376801 A1 | 12/2014 | Karsenti et al. | |
| 2015/0177161 A1 | 6/2015 | Jingu | |
| 2015/0178907 A1 | 6/2015 | Zhang et al. | |
| 2015/0324965 A1 | 11/2015 | Kulkarni | |

\* cited by examiner

SYSTEMS AND METHODS OF USING Z-LAYER CONTEXT IN LOGIC AND HOT SPOT INSPECTION FOR SENSITIVITY IMPROVEMENT AND NUISANCE SUPPRESSION

CROSS-REFERENCE TO RELATED APPLICATIONS

This application claims priority to U.S. Provisional Application No. 62/356,499, filed on Jun. 29, 2016, the disclosure of which is incorporated herein by reference.

FIELD OF THE DISCLOSURE

The present disclosure relates to defect detection, namely, systems and methods of using z-layer context in logic and hot spot inspection for sensitivity improvement and nuisance suppression.

BACKGROUND OF THE DISCLOSURE

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices such as ICs. However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary since even relatively small defects may cause unwanted aberrations in the semiconductor devices.

As design rules shrink, however, semiconductor manufacturing processes may be operating closer to the limitation on the performance capability of the processes. In addition, smaller defects can have an impact on the electrical parameters of the device as the design rules shrink, which drives more sensitive inspections. Therefore, as design rules shrink, the population of potentially yield relevant defects detected by inspection grows dramatically, and the population of nuisance defects detected by inspection also increases dramatically. Therefore, more and more defects may be detected on the wafers, and correcting the processes to eliminate all of the defects may be difficult and expensive. As such, determining which of the defects actually have an effect on the electrical parameters of the devices and the yield may allow process control methods to be focused on those defects while largely ignoring others. Furthermore, at smaller design rules, process induced failures may, in some cases, tend to be systematic. That is, process induced failures tend to fail at predetermined design patterns often repeated many times within the design. Elimination of spatially systematic, electrically relevant defects is important because eliminating such defects can have a significant overall impact on yield. Whether or not defects will affect device parameters and yield often cannot be determined from the inspection, review, and analysis processes described above since these processes may not be able to determine the position of the defect with respect to the electrical design.

Current run-time context map critical areas lack z-layer information. As such, segmentation based on the z-layer information into more accurate critical areas cannot be achieved. In some situations, z-layer information may be used in nuisance suppression, but only using design attributes. This may be done at an over arcing user interface level were only a few defects are reviewed in order to avoid long processing times. In addition, these techniques require excessive traffic between the image processor and the image data acquisition subsystem.

Therefore, current nuisance suppression methods require defect detection to be performed colder (i.e., with higher thresholds) to limit defect counts. In addition, it is not possible to use design information at a core-by-core basis today. Acquiring design information in postprocessing negatively impacts throughput and requires more memory. Lastly, the prior art systems lack a way to perform image segmentation based on design context. As such, present solutions create extremely small hotspots and there is a need to run pattern searching on larger areas of the wafer and then manually adjust the hotspots to be smaller.

BRIEF SUMMARY OF THE DISCLOSURE

One embodiment of the present disclosure could be described as a method for removing nuisance data. The method comprises receiving a design file corresponding to a wafer. The design file is received at a processor. The processor may be a single core of a multi-core computer. The design file has one or more z-layers.

The method further comprises receiving one or more critical areas of the wafer. The critical areas of the wafer are received at the processor. The critical areas of the wafer may be based on predetermined patterns in the design file and/or previously identified wafer defects. In one embodiment, the one or more critical areas comprise data from a run-time context map.

The method further comprises instructing an image data acquisition subsystem to capture one or more images corresponding to the one or more critical areas of the wafer.

The method further comprises receiving one or more potential defect locations in the one or more images. The potential defect locations correspond to the one or more critical areas of the wafer. The potential defect locations are received at the processor.

The method further comprises aligning the design file with the one or more potential defect locations that correspond to the one or more critical areas of the wafer. The alignment is performed using the processor.

The method further comprises identifying nuisance data in the one or more potential defect locations. Nuisance data is identified based on each potential defect location and the one or more z-layers of the aligned design file. The identification is performed using the processor. In one embodiment, the nuisance data is identified based on whether the location of each potential defect location is proximal to pattern data in each z-layer of the aligned design file.

The method further comprises removing the identified nuisance data from the one or more potential defect locations. The identified nuisance data is removed using the processor. The nuisance data may be identified based on subpixel defect location, overlap percentage, horizontal distance, or vertical distance to the one or more z-layers in the aligned design file.

In one embodiment, the method further comprises analyzing the design file to determine the one or more critical areas of the wafer based on pre-determined design rules. The analysis is performed using the processor.

In another embodiment, the method further comprises creating a synthetic image based on the design file and the one or more images corresponding to the one or more critical areas of the wafer. The synthetic image is created using the processor. In such embodiments, the step of identifying nuisance data in the one or more potential defect locations is also based on the synthetic image.

In one embodiment, the method further comprises segmenting the one or more critical areas of the wafer based on the one or more z-layers in the design file. The segmenting may be performed using the processor.

Another embodiment of the present disclosure could be described as a system for removing nuisance data. The system comprises an image data acquisition subsystem, a design file database, and a multi-core computer. The design file database comprises a plurality of design files associated with one or more wafers. Each design file has one or more z-layers. The multi-core computer is in electronic communication with the image data acquisition subsystem.

The multi-core computer has a plurality of processors. Each processor is configured to receive a design file from the design file database corresponding to a wafer. The design file has one or more z-layers.

Each processor is further configured to receive one or more images corresponding to one or more critical areas of the wafer. The critical areas of the wafer may be based on predetermined patterns in the design file. The critical areas of the wafer may be based on previously identified wafer defects. The one or more critical areas may comprise data from a run-time context map.

Each processor is further configured to receive one or more potential defect locations in the one or more images corresponding to the one or more critical areas of the wafer.

Each processor is further configured to align the design file with the one or more potential defect locations corresponding to the one or more critical areas of the wafer.

Each processor is further configured to identify nuisance data in the one or more potential defect locations based on each potential defect location and the one or more z-layers of the aligned design file. The nuisance data may be identified based on whether the location of each potential defect location is proximal to pattern data in each z-layer of the aligned design file. The nuisance data may be identified based on subpixel defect location, overlap percentage, horizontal distance, or vertical distance to the one or more z-layers in the aligned design file.

Each processor is further configured to remove the identified nuisance data from the one or more potential defect locations.

In one embodiment, each processor is further configured to analyze the design file to determine the one or more critical areas of the wafer based on pre-determined design rules.

In another embodiment, each processor is further configured to create a synthetic image based on the design file and the one or more images corresponding to the one or more critical areas of the wafer. In such embodiments, the nuisance data in the one or more potential defect locations is identified based on the synthetic image.

In one embodiment, each processor is further configured to segment the one or more critical areas of the wafer based on the one or more z-layers in the design file.

Another embodiment of the present disclosure may also be described as a non-transitory computer readable medium storing a program configured to instruct a processor to: receive a design file corresponding to a wafer, the design file having one or more z-layers; receive one or more critical areas of the wafer; instruct an image data acquisition subsystem to capture one or more images corresponding to the one or more critical areas of the wafer; receive one or more potential defect locations in the one or more images corresponding to the one or more critical areas of the wafer; align the design file with the one or more potential defect locations corresponding to the one or more critical areas of the wafer; identify nuisance data in the one or more potential defect locations based on each potential defect location and the one or more z-layers of the aligned design file; and remove the identified nuisance data from the one or more potential defect locations.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
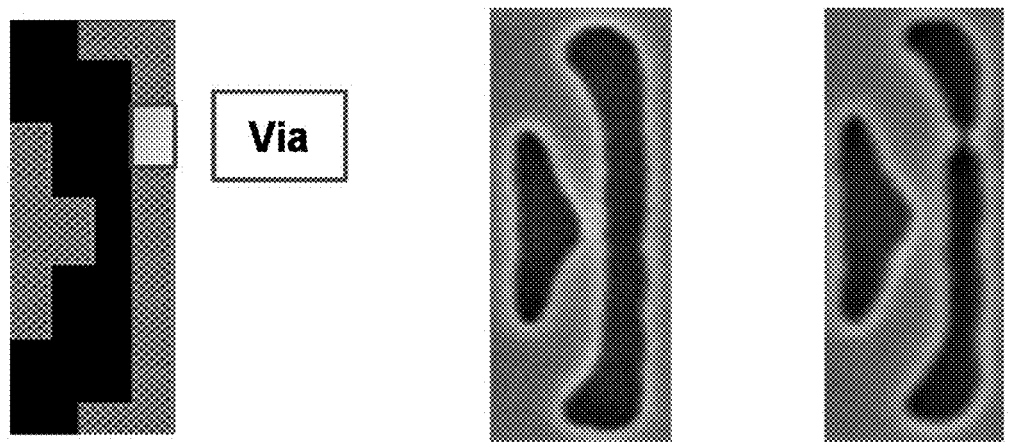
FIG. 1 is an exemplary illustration of a design representation of a pattern and images of the same pattern in a wafer showing a correct construction (center) and a defect (right)

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

As used herein, the term "wafer" generally refers to substrates formed of a semiconductor or non-semiconductor material. Examples of such a semiconductor or non-semiconductor material include, but are not limited to, monocrystalline silicon, gallium arsenide, and indium phosphide. Such substrates may be commonly found and/or processed in semiconductor fabrication facilities.

A wafer may include one or more layers formed upon a substrate. For example, such layers may include, but are not limited to, a resist, a dielectric material, and a conductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features. Formation and processing of such layers of material may ultimately result in completed devices. Many different types of devices such as integrated circuits (ICs) may be formed on a wafer, and the term wafer as used herein is intended to encompass a wafer on which any type of device known in the art is being fabricated. As used herein, the term "chip" may comprise a collection of ICs designed for a particular purpose.

Although embodiments are described herein with respect to wafers, it is to be understood that the embodiments may be used for another specimen such as a reticle, which may also be commonly referred to as a mask or a photomask. Many different types of reticles are known in the art, and the terms "reticle," "mask," and "photomask" as used herein are intended to encompass all types of reticles known in the art.

Detecting defects on a wafer may involve using one or more optics modes including performing a hot scan on the wafer using the one or more optics modes and one or more defect detection algorithms. A "hot scan" generally refers to a scan/inspection of a wafer performed to detect defects on the wafer by applying relatively aggressive detection settings (e.g., thresholds substantially close to the noise floor). In this manner, the hot scan may be performed to collect inspection data about the wafer that will be used for the tuning process (optics selection and algorithm tuning). The goal of the hot scan is to detect a representative sample of all defect and nuisance types on the wafer in the selected mode(s).

Embodiments described herein may include multiple hot scans, for example, one hot scan for optics selection and another for parameter tuning. The hot scan performed for parameter selection may be performed using optical mode(s) that were selected for wafer inspection. Selecting the optical mode(s) may include optics selection with overall scoring, which automatically calculates a single number that specifies how "good" a mode or combination of optics modes is at finding DOI while suppressing nuisance for a given set of defects. This eliminates the work of manually comparing the signal-to-noise ratio defect by defect across many modes and significantly reduces the optics selection time.

Embodiments described herein may utilize a set of processor nodes is configured to generate an image of the wafer using the image data stored in the arrays of the storage media and at least one additional source of data for the wafer. In this manner, the set of processor nodes may be configured to perform multi-channel image fusion. The additional source(s) of data for the wafer may include any information that is available at the time of image fusion. Such data sources may include, but are not limited to, design data, a die context map generated offline using design layout, a die context map generated offline from image(s), defect detection results, defect detection results generated using image data generated by different detection channels of an inspection system, image data generated by multiple (different) scans of the wafer (e.g., multiple scans performed using different imaging modes of the inspection system), information about a reticle used to print patterns on the wafer, etc.

Image fusion may not include simply overlaying multiple sources of data (although such overlay may also be performed by the embodiments described herein). Instead, image fusion may include combining multiple sources of data to generate a composite image. Image fusion may also be performed as described in commonly owned U.S. patent application Ser. No. 12/359,476 by Chen et al, filed Jan. 26, 2009, published as U.S. Patent Application Publication No. 2010/0188657 on Jul. 29, 2010 which is incorporated by reference.

In one embodiment an image of a reticle generated by a reticle inspection system is used as image data in the image data space. In this manner an image or a reticle generated by a reticle inspection system may be used as a substitute for image data. The image of the reticle used in this embodiment may include any suitable image of the reticle generated in any suitable manner by any reticle inspection system known in the art. For example the image of the reticle may be a high magnification optical or electron beam image of the reticle acquired by a high magnification optical reticle inspection system or an electron beam based reticle inspection system respectively. Alternatively the image of the reticle may be an aerial image of the reticle acquired by an aerial imaging reticle inspection system.

The term "critical areas" can be generally defined as areas on the wafer that a user cares about for some reason and therefore should be inspected. In one example of currently used critical areas, critical areas for one layer of a wafer may be defined such that the critical areas include critical features that are formed on the layer and do not include non-critical features that are formed on the layer. A dynamic critical area is a critical area generated based on results of an inspection or automated defect review step performed on a wafer for use by a subsequent inspection or review step performed on the same wafer.

One method for determining critical areas for inspection includes acquiring inspection results for a wafer generated by a first inspection process. Acquiring the inspection results may include actually performing the first inspection process on the wafer (e.g., by scanning the wafer using an inspection tool and detecting defects on the wafer using output generated by the scanning). However, acquiring the inspection results may not include performing the first inspection process. For example, acquiring the inspection results may include acquiring the inspection results from a storage medium in which the inspection results have been stored by another method or system (e.g., another method or system that performed the first inspection process). The first inspection process may include any suitable inspection process including any of those described further herein. The first inspection process may include performing a hot recipe at the first inspection process that generates inspection results such as defect locations. The inspection results may include any and all inspection results that may be generated by an inspection process.

The first inspection process may be performed on the wafer after a first fabrication step has been performed on the wafer and before a second fabrication step has been performed on the wafer. A fabrication step as used herein generally refers to any semiconductor fabrication process that involves changing the wafer in some manner physically, chemically, mechanically, etc. For example, a fabrication step may include a lithography process, an etch process, a chemical-mechanical polishing process, and the like. In one such example, the first fabrication step may be a lithography process, and the second fabrication step may be an etch process. The first and second fabrication steps may be performed one after the other on the wafer (e.g., without performing any other fabrication steps on the wafer between the first and second fabrication steps). In contrast, processes that may be performed on a wafer that do not include intentionally altering the wafer include inspection and review processes.

Determining critical areas may also include determining critical areas for a second inspection process based on the inspection results. The second inspection process will be performed on the wafer after the second fabrication step has been performed on the wafer. Determining the critical areas may include determining the locations or areas on the wafer that will be inspected and one or more inspection parameters that will be used to detect defects in each of the critical areas. The one or more inspection parameters determined for some critical areas may be different than the one or more inspection parameters determined for other critical areas. For example, the method allows the sensitivity for a given inspection step in selected regions of a specific wafer to be tailored to noise and signals detected on that specific wafer by an inspection at an earlier step. In other words, the method may utilize inspection results from one inspection step to enhance or detune sensitivity of the wafer at a subsequent inspection step or steps. In this manner, the method may correlate an inspection step performed after one fabrication process with an inspection step performed after the next or another fabrication process.

In most semiconductor fabrication facilities, inspection recipes are run fairly cold to provide stability of results to small changes in processes that do not affect yield. By selectively enhancing sensitivity in the areas on a per wafer basis, one can better detect defects in critical areas based on signals recorded from an earlier inspection of that wafer without giving up much on stability.

Acquiring the inspection results and determining the critical areas are performed using a computer system, which may be configured as described herein.

In order for the schemes described herein to work to their maximum potential, the critical areas should be substantially accurately aligned to design space. Methods and systems for aligning design space to inspection or wafer space are described in commonly owned U.S. Pat. No. 7,676,077 to Kulkarni et al., which is incorporated by reference as if fully set forth herein. Any of the methods and systems described in this patent may be used in the methods described herein to align the design space to inspection or wafer space and vice versa.

In one embodiment, the inspection results include noise events, marginal defects, and detected defects, and the critical areas are determined such that the critical areas include locations of at least some of the noise events, the marginal defects, and the detected defects. Noise events can be generally defined as signals that have values that are above the noise floor and are closer to the noise floor than to the defect detection threshold. Marginal defects can be generally defined as signals that have values that are below the defect detection threshold and are closer to the defect detection threshold than to the noise floor. The locations of the noise events, marginal defects, and detected defects can be used to determine the locations of the critical areas of the subsequent inspection step. In this manner, the method may include utilizing inspection results from one inspection step to sensitize or desensitize inspection of the wafer at a subsequent inspection step by utilizing the spatial location of a defect or signal at the first step.

A run-time context map (RTCM) can be generated and context-based inspection (CBI) can be performed as described in the above-referenced patent to Kulkarni et al. DBC can be performed as described in commonly owned U.S. Pat. No. 7,570,796 to Zafar et al. issued on Aug. 4, 2009, which is incorporated by reference as if fully set forth herein.

In some embodiments, the inspection results include noise events, marginal defects, and detected defects. Embodiments of the present disclosure may include determining design-based information for at least some of the noise events, marginal defects, and detected defects, and determining the critical areas is performed based on the design-based information.

In one embodiment, an inspection system is used to collect image data. For example, the optical and electron beam output acquisition subsystems described herein may be configured as inspection systems. In another embodiment, the image data acquisition subsystem is a defect review system. For example, the optical and electron beam output acquisition subsystems described herein may be configured as defect review systems. In a further embodiment, the image data acquisition subsystem is a metrology system. For example, the optical and electron beam output acquisition subsystems described herein may be configured as metrology systems. In particular, the embodiments of the output acquisition subsystems described herein and shown in FIG. 3 may be modified in one or more parameters to provide different imaging capability depending on the application for which they will be used. In one such example, the image data acquisition subsystem shown in FIG. 3 may be configured to have a higher resolution if it is to be used for defect review or metrology rather than for inspection. In other words, the embodiments of the image data acquisition subsystem shown in FIG. 3 describe some general and various configurations for an image data acquisition subsystem that can be tailored in a number of manners that will be obvious to one skilled in the art to produce output acquisition subsystems having different imaging capabilities that are more or less suitable for different applications.

The systems and methods of the present disclosure may utilize output acquisition subsystems, defect review output acquisition subsystems, and metrology image data acquisition subsystems that are configured for inspection, defect review, and metrology of specimens such as wafers and reticles. For example, the embodiments described herein may be configured for using both scanning electron microscopy (SEM) and optical images for the purposes of mask inspection, wafer inspection, and wafer metrology. In particular, the embodiments described herein may be installed on a computer node or computer cluster that is a component of or coupled to an image data acquisition subsystem such as a broadband plasma inspector, an electron beam inspector or defect review tool, a mask inspector, a virtual inspector, etc. In this manner, the embodiments described herein may generate output that can be used for a variety of applications that include, but are not limited to, wafer inspection, mask inspection, electron beam inspection and review, metrology, etc. The characteristics of the output acquisition subsystems shown in FIG. 3 can be modified as described above based on the specimen for which it will generate actual output.

Such a subsystem includes an image data acquisition subsystem that includes at least an energy source and a detector. The energy source is configured to generate energy that is directed to a wafer. The detector is configured to detect energy from the wafer and to generate output responsive to the detected energy.

Figure 3:
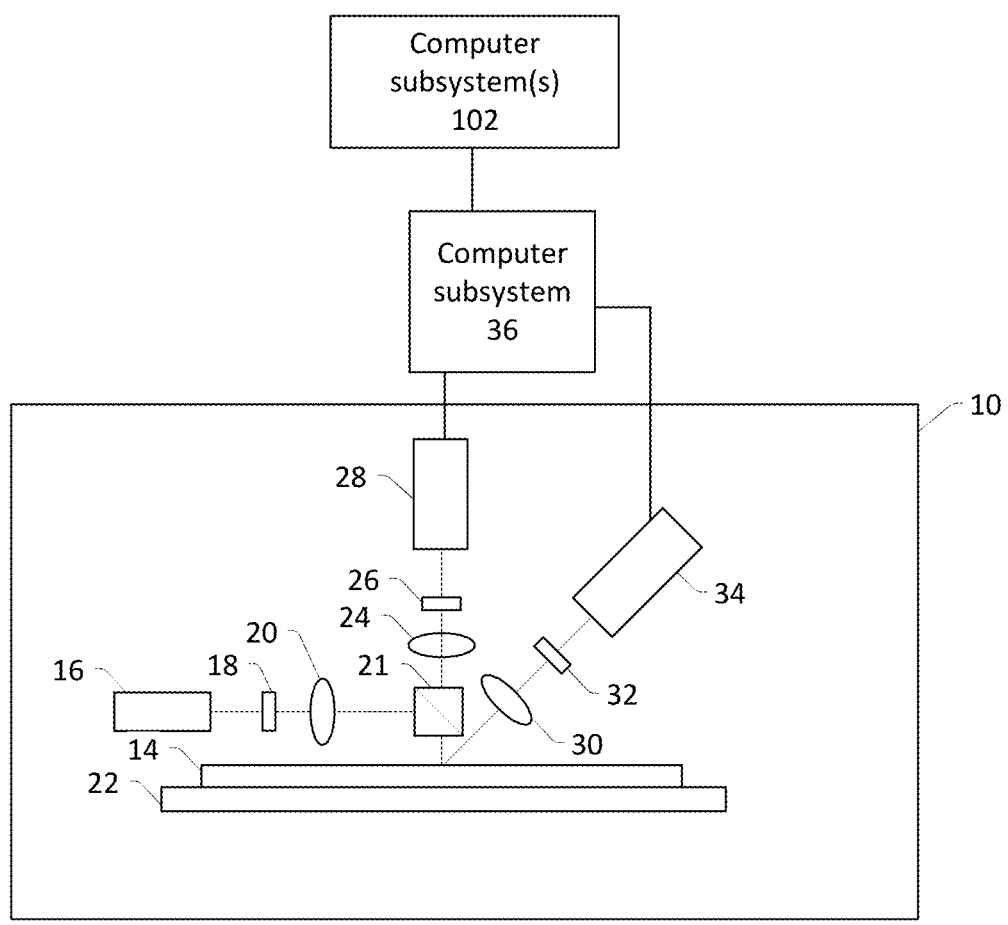
FIG. 3 is a diagram of an inspection system for collecting an image.

In one embodiment, the energy directed to the wafer includes light, and the energy detected from the wafer includes light. For example, in the embodiment of the system shown in FIG. 3, image data acquisition subsystem 10 includes an illumination subsystem configured to direct light to wafer 14. The illumination subsystem includes at least one light source. For example, as shown in FIG. 3, the illumination subsystem includes light source 16. In one embodiment, the illumination subsystem is configured to direct the light to the wafer at one or more angles of incidence, which may include one or more oblique angles and/or one or more normal angles. For example, as shown in FIG. 3, light from light source 16 is directed through optical element 18 and then lens 20 to beam splitter 21, which directs the light to wafer 14 at a normal angle of incidence. The angle of incidence may include any suitable angle of incidence, which may vary depending on, for instance, characteristics of the wafer.

The illumination subsystem may be configured to direct the light to the wafer at different angles of incidence at different times. For example, the image data acquisition subsystem may be configured to alter one or more characteristics of one or more elements of the illumination subsystem such that the light can be directed to the wafer at an angle of incidence that is different than that shown in FIG. 3. In one such example, the image data acquisition subsystem may be configured to move light source 16, optical element 18, and lens 20 such that the light is directed to the wafer at a different angle of incidence.

In some instances, the image data acquisition subsystem may be configured to direct light to the wafer at more than one angle of incidence at the same time. For example, the illumination subsystem may include more than one illumination channel, one of the illumination channels may include light source 16, optical element 18, and lens 20 as shown in FIG. 3 and another of the illumination channels (not shown) may include similar elements, which may be configured differently or the same, or may include at least a light source and possibly one or more other components such as those described further herein. If such light is directed to the wafer at the same time as the other light, one or more characteristics (e.g., wavelength, polarization, etc.) of the light directed to the wafer at different angles of incidence may be different such that light resulting from illumination of the wafer at the different angles of incidence can be discriminated from each other at the detector(s).

In another instance, the illumination subsystem may include only one light source (e.g., source 16 shown in FIG. 3) and light from the light source may be separated into different optical paths (e.g., based on wavelength, polarization, etc.) by one or more optical elements (not shown) of the illumination subsystem. Light in each of the different optical paths may then be directed to the wafer. Multiple illumination channels may be configured to direct light to the wafer at the same time or at different times (e.g., when different illumination channels are used to sequentially illuminate the wafer). In another instance, the same illumination channel may be configured to direct light to the wafer with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the wafer at different times. The illumination subsystem may have any other suitable configuration known in the art for directing the light having different or the same characteristics to the wafer at different or the same angles of incidence sequentially or simultaneously.

In one embodiment, light source 16 may include a broadband plasma (BBP) light source. In this manner, the light generated by the light source and directed to the wafer may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused to beam splitter 21 by lens 20. Although lens 20 is shown in FIG. 3 as a single refractive optical element, it is to be understood that, in practice, lens 20 may include a number of refractive and/or reflective optical elements that in combination focus the light from the optical element to the wafer. The illumination subsystem shown in FIG. 3 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for output acquisition.

The image data acquisition subsystem may also include a scanning subsystem configured to cause the light to be scanned over the wafer. For example, the image data acquisition subsystem may include stage 22 on which wafer 14 is disposed during output acquisition. The scanning subsystem may include any suitable mechanical and/or robotic assembly (that includes stage 22) that can be configured to move the wafer such that the light can be scanned over the wafer. In addition, or alternatively, the image data acquisition subsystem may be configured such that one or more optical elements of the image data acquisition subsystem perform some scanning of the light over the wafer. The light may be scanned over the wafer in any suitable fashion.

The image data acquisition subsystem further includes one or more detection channels. At least one of the one or more detection channels includes a detector configured to detect light from the wafer due to illumination of the wafer by the image data acquisition subsystem and to generate output responsive to the detected light. For example, the image data acquisition subsystem shown in FIG. 3 includes two detection channels, one formed by collector 24, element 26, and detector 28 and another formed by collector 30, element 32, and detector 34. As shown in FIG. 3, the two detection channels are configured to collect and detect light at different angles of collection. In some instances, one detection channel is configured to detect specularly reflected light, and the other detection channel is configured to detect light that is not specularly reflected (e.g., scattered, diffracted, etc.) from the wafer. However, two or more of the detection channels may be configured to detect the same type of light from the wafer (e.g., specularly reflected light). Although FIG. 3 shows an embodiment of the image data acquisition subsystem that includes two detection channels, the image data acquisition subsystem may include a different number of detection channels (e.g., only one detection channel or two or more detection channels). Although each of the collectors are shown in FIG. 3 as single refractive optical elements, it is to be understood that each of the collectors may include one or more refractive optical element(s) and/or one or more reflective optical element(s).

The one or more detection channels may include any suitable detectors known in the art. For example, the detectors may include photo-multiplier tubes (PMTs), charge coupled devices (CCDs), and time delay integration (TDI) cameras. The detectors may also include any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the image data acquisition subsystem may be signals or data, but not image signals or image data. In such instances, a computer subsystem such as computer subsystem 36 of the system may be configured to generate images of the wafer from the non-imaging output of the detectors. However, in other instances, the detectors may be configured as imaging detectors that are configured to generate imaging signals or image data. Therefore, the system may be configured to generate the images described herein in a number of ways.

It is noted that FIG. 3 is provided herein to generally illustrate a configuration of an image data acquisition subsystem that may be included in the system embodiments described herein. Obviously, the image data acquisition subsystem configuration described herein may be altered to optimize the performance of the system as is normally performed when designing a commercial system. In addition, the systems described herein may be implemented using an existing output acquisition system (e.g., by adding functionality described herein to an existing output acquisition system) such as tools that are commercially available from KLA-Tencor. For some such systems, the methods described herein may be provided as optional functionality of the output acquisition system (e.g., in addition to other functionality of the output acquisition system). Alternatively, the system described herein may be designed "from scratch" to provide a completely new system.

Computer subsystem 36 of the system may be coupled to the detectors of the image data acquisition subsystem in any suitable manner (e.g., via one or more transmission media, which may include "wired" and/or "wireless" transmission media) such that the computer subsystem can receive the output generated by the detectors during scanning of the wafer. Computer subsystem 36 may be configured to perform a number of functions using the output of the detectors as described herein and any other functions described further herein. This computer subsystem may be further configured as described herein.

This computer subsystem (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems as described further herein. For example, computer subsystem 36 may be coupled to computer subsystem(s) 102 by any suitable transmission media, which may include any suitable wired and/or wireless transmission media known in the art. Two or more of such computer subsystems may also be effectively coupled by a shared computer-readable storage medium (not shown).

Figure 4:
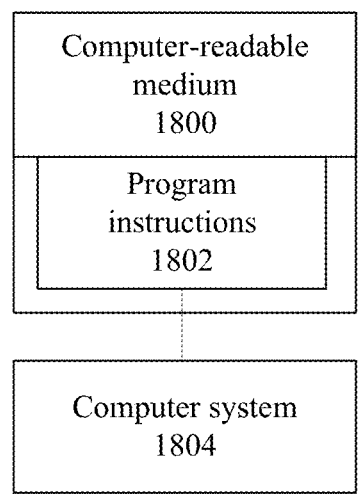
FIG. 4 is a diagram showing a non-transitory computer-readable medium storing program instructions executable on a computer system for performing a computer-implemented method of the present disclosure.

An additional embodiment relates to a non-transitory computer-readable medium storing program instructions executable on a computer system for performing a computer-implemented method for mode selection and image fusion. One such embodiment is shown in FIG. 4. In particular, as shown in FIG. 4, non-transitory computer-readable medium 1800 includes program instructions 1802 executable on computer system 1804. The computer-implemented method may include any step(s) of any method(s) described herein.

Program instructions 1802 implementing methods such as those described herein may be stored on computer-readable medium 1800. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 1804 may be configured according to any of the embodiments described herein.

The systems and methods disclosed herein may improve defect detection sensitivity by utilizing z-layer context information. The z-layer context information may be used through RTCM data. The systems and methods disclosed herein achieve nuisance suppression on a core by core basis, which can be executed in an imaging computer, or any other computer in the system, at the smallest unit of processing.

In one embodiment, the systems and methods disclosed herein embed z-layer information as part of RTCM data and passes information as context information to the processor. The processor can process this information for region segmentation which leads to better sensitivity.

Z-layer context can be created by combining multiple design layers. Providing tools with operations such as grow and shrink, and applying logical expressions to create context may help users to create different kinds of z-layer context.

In some embodiments, the processor can calculate design attributes, such as overlap percentage horizontal/vertical distance to the z-layer context, and use these attributes in nuisance suppression. The processor can also calculate defect size on a sub pixel basis using curve fitting and thresholding an analog space for calculating the design attributes at a higher accuracy. For example, the systems and methods of the present disclosure can be used alongside hotspot inspection and still achieve better sensitivity and nuisance suppression. In some situations, critical defects or defects of interest may be identified within groups of nuisance data.

In some embodiments, this z-layer context information can be used to segment pixels to reduce noise or use different thresholds for different segments of the context. Since the z-layer information is going through alignment, there is no design clip acquisition overhead at the processor. All the required information is constructed in RTCM data itself.

In some embodiments, the processor may compute context attributes and utilize them in methods such as design-based binning for additional nuisance suppression.

One embodiment of the present disclosure can be described as a method for removing nuisance data. The method comprises receiving, at a processor, a design file corresponding to a wafer. The design file having one or more z-layers.

Figure 2:
FIG. 2 is an exemplary illustration of locating critical features in a design file.
Figure 5:
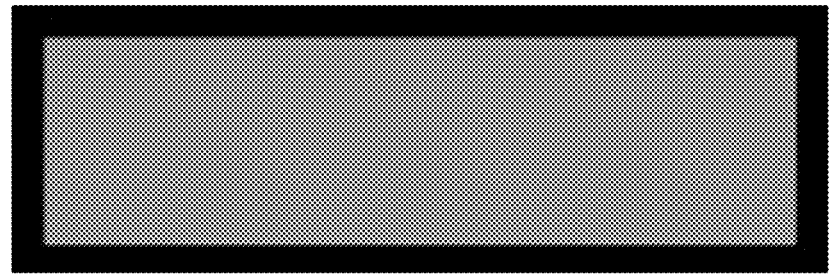
FIG. 5 is an exemplary illustration of a defect hotspot without a design overlay.

The method further comprises receiving, at the processor, one or more critical areas of the wafer. FIG. 2 illustrates a highlighted critical area of a wafer. FIG. 5 illustrates the critical area segmented or separated from the rest of the wafer. This may be referred to as a hotspot critical area. The hotspot critical area may be used for inspection after sub-pixel alignment. In some embodiments, all pixels in the hotspot critical area are treated the same. Likewise, all defects detected in the hotspot critical area may be treated the same. The critical areas of the wafer may be based on predetermined patterns in the design file or previously identified wafer or design defects or defect areas.

Figure 7:
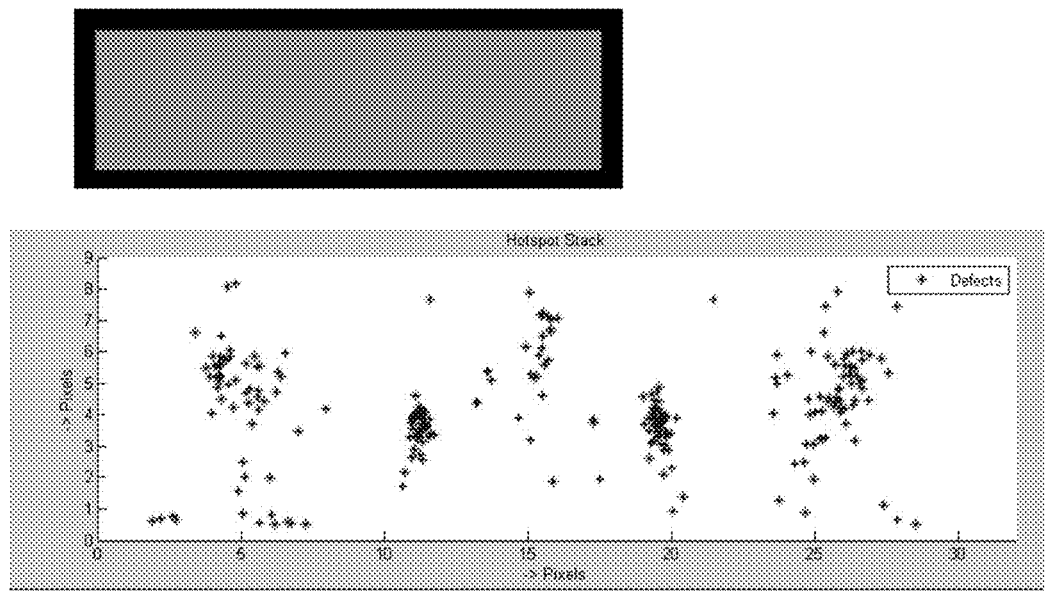
FIG. 7 is an exemplary illustration of potential defects identified in the defect hotspot of FIG. 5.

The method further comprises instructing an image data acquisition subsystem to capture one or more images corresponding to the one or more critical areas of the wafer. The method further comprises receiving, at the processor, one or more potential defect locations in the one or more images corresponding to the one or more critical areas of the wafer. For example, the potential defect locations may be a list of coordinates within the critical area or within the wafer. Instead of a physical location, the potential defect locations may correspond to pixel or semi-pixel coordinates in the image. Another example of a list of potential defect locations can be seen in the pixel map of FIG. 7.

Figure 6:
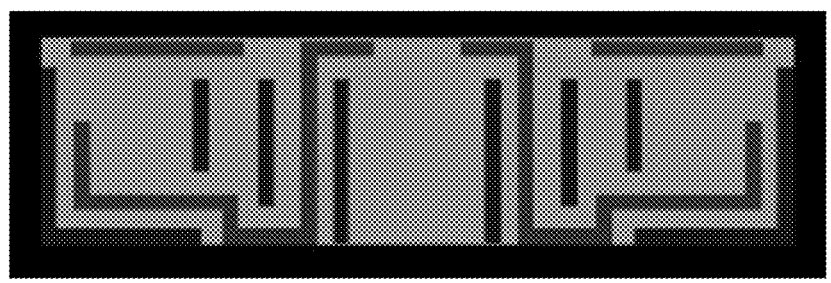
FIG. 6 is an exemplary illustration of a defect hotspot with a design overlay.
Figure 8:
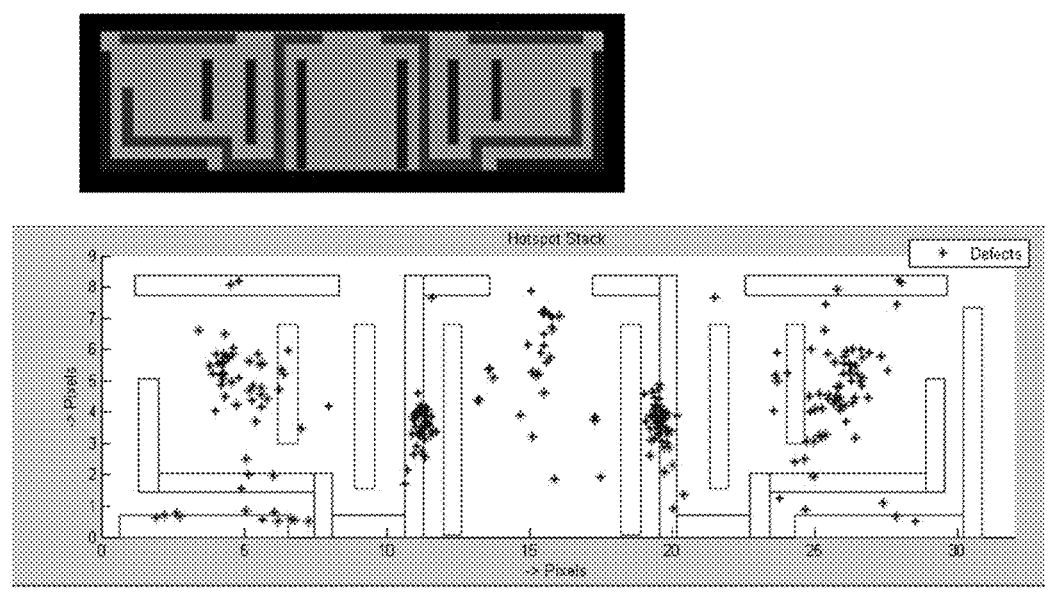
FIG. 8 is an exemplary illustration of potential defects identified in the defect hotspot of FIG. 6, wherein the design file is overlaid on the defect hotspot.

The method further comprises aligning, using the processor, the design file with the one or more potential defect locations corresponding to the one or more critical areas of the wafer. One such example of the alignment of the design file and the critical area can be seen in FIG. 6. Once aligned, the method further comprises identifying, using the processor, nuisance data in the one or more potential defect locations based on each potential defect location and the one or more z-layers of the aligned design file. FIG. 8 illustrates the overlay of potential defect locations on the z-layers of the aligned design file. In this example, there are two z-layers. In some embodiments, manual editing of z-layers can be provided to suit additional requirements. Grow polygons, merge polygons, logical operations like And, Or, and XOR, etc. can be provided on the design file to create z-layer context.

In one embodiment, the method may further comprise analyzing the design file, using the processor, to determine the one or more critical areas of the wafer based on predetermined design rules. Rules can be executed to create the context mask. In some embodiments, the z-layer context is passed to the processor with angstrom accuracy with regard to the critical area for defect detection.

Figure 9:
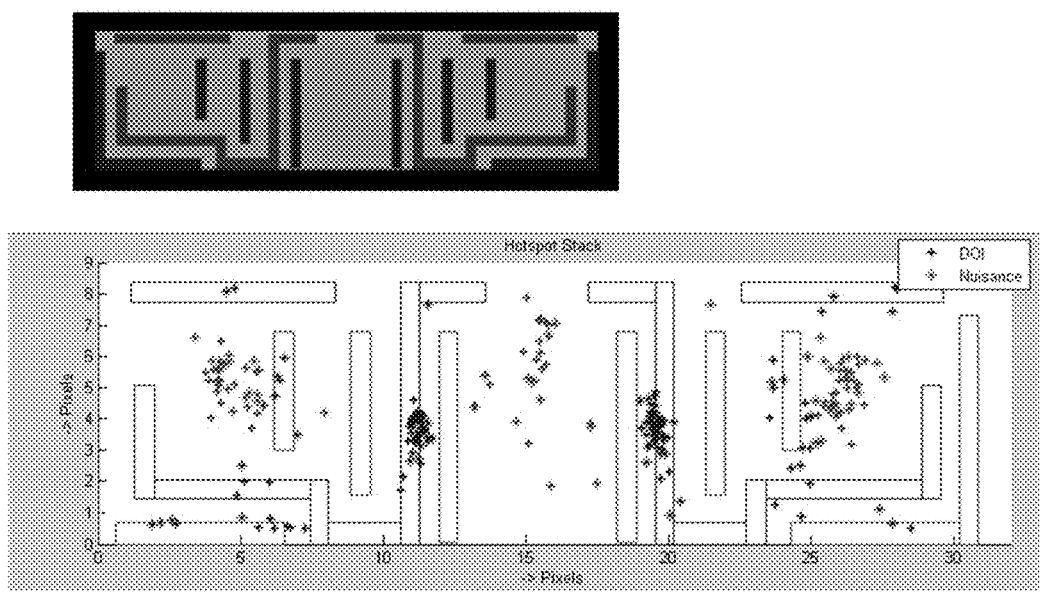
FIG. 9 is an exemplary illustration of the potential defects identified and categorized into defects of interest and nuisance defects based on the overlaid design file on the defect hotspot.

The method further comprises removing, using the processor, the identified nuisance data from the one or more potential defect locations. FIG. 9 illustrates how, in this particular example, potential defect locations are identified as nuisance data when they are not proximal to the one or more z-layers. In another embodiment, nuisance data is identified based on whether the location of each potential defect location is proximal to pattern data in each z-layer of the aligned design file. In yet another embodiment, the nuisance data is identified based on subpixel defect location, overlap percentage, horizontal distance, or vertical distance to the one or more z-layers in the aligned design file.

The method may further comprise, creating, using the processor, a synthetic image based on the design file and the one or more images corresponding to the one or more critical areas of the wafer. In such an embodiment, the step of identifying nuisance data in the one or more potential defect locations may also be based on the synthetic image.

The method may further comprise segmenting, using the processor, the one or more critical areas of the wafer based on the one or more z-layers in the design file.

Figure 10:
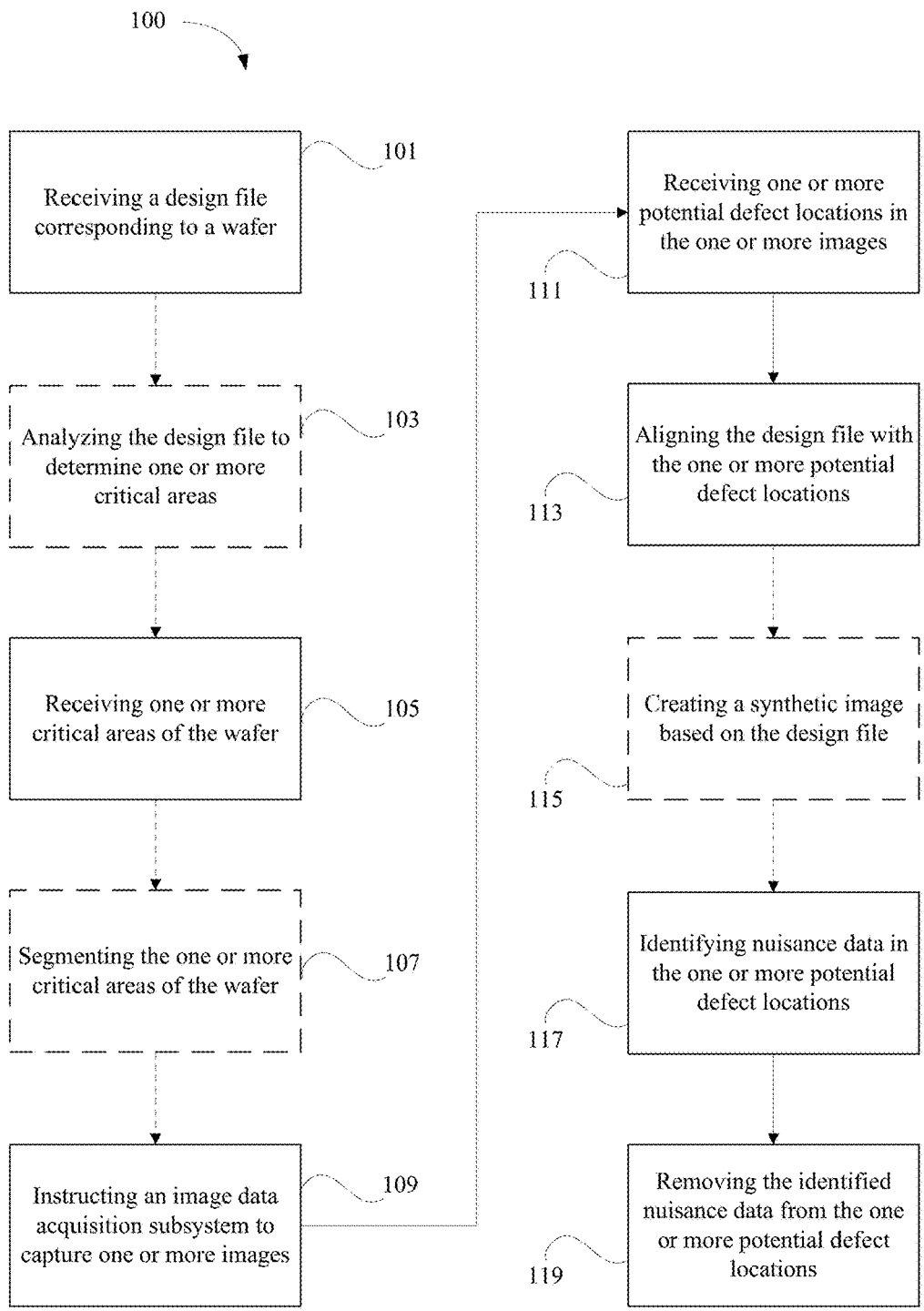
FIG. 10 is a flowchart showing a method according to one embodiment of the present disclosure.

FIG. 10 is a flowchart illustrating one method 100 embodying the present disclosure. Method 100 comprises receiving 101 a design file corresponding to a wafer. The design file may correspond to a subset of the wafer for three design that is repeated on the wafer. The design file may be received 101 from a local hard drive, over an electronic connection (such as an intranet or Internet), or from a remote server.

Method 100 may further comprise analyzing 103 the design file to determine one or more critical areas. A processor may analyze 103 design file. Critical areas may be determined using previous defects data or may be manually determined based on prior data.

The method 100 may further comprise receiving 105 one or more critical areas of the wafer. The critical areas may be received 105 based on the analyzed 103 design file. The critical areas may also be received 105 from a local hard drive, a remote server, or via an intranet or Internet. The critical areas may be received 105 at the processor, stored in local storage, or stored in RAM for use by the processor. The method 100 may further comprise segmenting 107 the one or more critical areas of the wafer. The segmenting 107 may be performed by the processor.

The method 100 may further comprise instructing 109 an image data acquisition subsystem to capture one or more images of the wafer. The images may be of the segmented critical areas of the wafer. The images may be captured during a hot scan of the wafer. The processor may receive 111 one or more potential defect locations in the images. These are potential defect locations because the images may indicate nuisance data or an actual defect.

The method 100 may further comprise aligning 113 the design file with the one or more potential defect locations. In one embodiment, the method 100 may further comprise creating 115 a synthetic image based on the design file. For example, the processor may overlay one or more z-layers in the design file over the images captured by the image data acquisition subsystem.

The method 100 may further comprise identifying 117 nuisance data in the one or more potential defect locations. Nuisance data may be identified 117 using the design file. For example, if a potential defect location does not overlap with a feature area in the design file, it may be nuisance data. Other algorithms and methods of identifying 117 nuisance data are disclosed above.

The method 100 may further comprise removing 119 the identified nuisance data from the one or more potential defect locations. The identified nuisance data may be removed 119 from the dataset or flagged as nuisance data so that it is not analyzed in the future.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A method for removing nuisance data comprising:
   receiving, at a processor, a design file corresponding to a wafer, the design file having one or more z-layers;
   receiving, at the processor, one or more critical areas of the wafer;
   instructing an image data acquisition subsystem to capture one or more images corresponding to the one or more critical areas of the wafer;
   receiving, at the processor, one or more potential defect locations in the one or more images corresponding to the one or more critical areas of the wafer;
   aligning, using the processor, the design file with the one or more potential defect locations corresponding to the one or more critical areas of the wafer;
   creating, using the processor, a synthetic image based on the design file and the one or more images corresponding to the one or more critical areas of the wafer;
   identifying, using the processor, nuisance data in the one or more potential defect locations based on each potential defect location, the one or more z-layers of the aligned design file, and the synthetic image; and
   removing, using the processor, the identified nuisance data from the one or more potential defect locations.

2. The method of claim 1, further comprising:
   analyzing the design file, using the processor, to determine the one or more critical areas of the wafer based on pre-determined design rules.

3. The method of claim 1, wherein the nuisance data is identified based on whether the location of each potential defect location is proximal to pattern data in each z-layer of the aligned design file.

4. The method of claim 1, wherein the critical areas of the wafer are based on predetermined patterns in the design file.

5. The method of claim 1, wherein the critical areas of the wafer are based on previously identified wafer defects.

6. The method of claim 1, wherein the one or more critical areas comprise data from a run-time context map.

7. The method of claim 1, further comprising:
   segmenting, using the processor, the one or more critical areas of the wafer based on the one or more z-layers in the design file.

8. The method of claim 1, wherein the nuisance data is identified based on subpixel defect location, overlap percentage, horizontal distance, or vertical distance to the one or more z-layers in the aligned design file.

9. The method of claim 1, wherein the processor is a single core of a multi-core computer.

10. A system for removing nuisance data comprising:
    an image data acquisition subsystem;
    a design file database comprising a plurality of design files associated with one or more wafers, each design file having one or more z-layers; and
    a multi-core computer in electronic communication with the image data acquisition subsystem, the multi-core computer having a plurality of processors, each processor configured to:
      receive a design file from the design file database corresponding to a wafer, the design file having one or more z-layers;
      receive one or more images corresponding to one or more critical areas of the wafer;
      receive one or more potential defect locations in the one or more images corresponding to the one or more critical areas of the wafer;
      align the design file with the one or more potential defect locations corresponding to the one or more critical areas of the wafer;
      create a synthetic image based on the design file and the one or more images corresponding to the one or more critical areas of the wafer;
      identify nuisance data in the one or more potential defect locations based on each potential defect location, the one or more z-layers of the aligned design file, and the synthetic image; and
      remove the identified nuisance data from the one or more potential defect locations.

11. The system of claim 10, wherein each processor is further configured to:
    analyze the design file to determine the one or more critical areas of the wafer based on pre-determined design rules.

12. The system of claim 10, wherein the nuisance data is identified based on whether the location of each potential defect location is proximal to pattern data in each z-layer of the aligned design file.

13. The system of claim 10, wherein the critical areas of the wafer are based on predetermined patterns in the design file.

14. The system of claim 10, wherein the critical areas of the wafer are based on previously identified wafer defects.

15. The system of claim 10, wherein the one or more critical areas comprise data from a run-time context map.

16. The system of claim 10, wherein each processor is further configured to:
    segment the one or more critical areas of the wafer based on the one or more z-layers in the design file.

17. The system of claim 10, wherein the nuisance data is identified based on subpixel defect location, overlap percentage, horizontal distance, or vertical distance to the one or more z-layers in the aligned design file.

18. A non-transitory computer readable medium storing a program configured to instruct a processor to:
    receive a design file corresponding to a wafer, the design file having one or more z-layers;
    receive one or more critical areas of the wafer;
    instruct an image data acquisition subsystem to capture one or more images corresponding to the one or more critical areas of the wafer;
    receive one or more potential defect locations in the one or more images corresponding to the one or more critical areas of the wafer;
    align the design file with the one or more potential defect locations corresponding to the one or more critical areas of the wafer;

create a synthetic image based on the design file and the one or more images corresponding to the one or more critical areas of the wafer;

identify nuisance data in the one or more potential defect locations based on each potential defect location, the one or more z-layers of the aligned design file, and the synthetic image; and remove the identified nuisance data from the one or more potential defect locations.

* * * * *